United States Patent
Robinson et al.

(10) Patent No.: US 10,037,469 B2
(45) Date of Patent: Jul. 31, 2018

(54) IMAGE LOCATION THROUGH LARGE OBJECT DETECTION

(71) Applicant: Google LLC, Mountain View, CA (US)

(72) Inventors: Craig Lewin Robinson, Palo Alto, CA (US); Arunachalam Narayanaswamy, Sunnyvale, CA (US); Marco Zennaro, San Francisco, CA (US)

(73) Assignee: Google LLC, Mountain View, CA (US)

( * ) Notice: Subject to any disclaimer, the term of this patent is extended or adjusted under 35 U.S.C. 154(b) by 212 days.

(21) Appl. No.: 14/564,517

(22) Filed: Dec. 9, 2014

(65) Prior Publication Data

US 2015/0161441 A1    Jun. 11, 2015

Related U.S. Application Data

(60) Provisional application No. 61/914,231, filed on Dec. 10, 2013.

(51) Int. Cl.
     *G06K 9/00*          (2006.01)
     *G06K 9/46*          (2006.01)

(52) U.S. Cl.
     CPC ..... *G06K 9/00791* (2013.01); *G06K 9/00637* (2013.01); *G06K 9/00818* (2013.01); *G06K 9/4652* (2013.01)

(58) Field of Classification Search
None
See application file for complete search history.

(56) References Cited

U.S. PATENT DOCUMENTS

| 6,453,056 B2 * | 9/2002 | Laumeyer | G06K 9/00818 340/933 |
| 6,801,638 B1 * | 10/2004 | Janssen | B60K 35/00 340/910 |
| 7,068,844 B1 * | 6/2006 | Javidi | G06K 9/00818 382/209 |

(Continued)

OTHER PUBLICATIONS

Pollefeys et al., "Structure and Motion from image sequences", Conference on Optical 3-D Measurement Techniques, 2001, pp. 251-258.*

*Primary Examiner* — Matthew Bella
*Assistant Examiner* — Jose M Torres
(74) *Attorney, Agent, or Firm* — Lerner, David, Littenberg, Krumholz & Mentlik, LLP

(57) ABSTRACT

Camera pose optimization, which includes determining the position and orientation of a camera in three-dimensional space at different times, is improved by detecting a higher-confidence reference object in the photographs captured by the camera and using the object to increase consistency and accuracy of pose data. Higher-confidence reference objects include objects that are stationary, fixed, easily recognized, and relatively large. In one embodiment, street level photographs of a geographic area are collected by a vehicle with a camera. The captured images are geo-coded using GPS data, which may be inaccurate. The vehicle drives in a loop and captures the same reference object multiple times from the substantially same position. The trajectory of the vehicle is then closed by aligning the points of multiple images where the trajectory crosses itself. This creates an additional constraint on the pose data, which in turn improves the data's consistency and accuracy.

20 Claims, 12 Drawing Sheets

(56) References Cited

U.S. PATENT DOCUMENTS

| | | | |
|---|---|---|---|
| 2001/0036293 A1* | 11/2001 | Laumeyer | G06K 9/00818 382/104 |
| 2004/0086153 A1* | 5/2004 | Tsai | G06K 9/3233 382/104 |
| 2005/0190972 A1* | 9/2005 | Thomas | G06K 9/209 382/218 |
| 2011/0109476 A1* | 5/2011 | Porikli | G06K 9/00818 340/905 |
| 2012/0163656 A1* | 6/2012 | Wang | G01C 15/00 382/103 |
| 2013/0163820 A1* | 6/2013 | Shimomura | G06K 9/00791 382/104 |
| 2013/0230214 A1* | 9/2013 | Arth | G06T 7/0044 382/107 |
| 2014/0172290 A1* | 6/2014 | Prokhorov | G01C 21/3602 701/408 |

* cited by examiner

IMAGE LOCATION THROUGH LARGE OBJECT DETECTION

CROSS-REFERENCE TO RELATED APPLICATIONS

The present application claims the benefit of the filing date of U.S. Provisional Patent Application No. 61/914,231 filed Dec. 10, 2013, the disclosure of which is hereby incorporated herein by reference.

FIELD OF THE DISCLOSURE

This disclosure relates to automatically improving image location and orientation using higher-confidence reference objects within an image.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Techniques for determining geographic locations of objects depicted in photographs can be used in various three-dimensional (3D) modeling and mapping applications. For example, some of the software mapping systems that provide interactive digital maps generate 3D streetscapes, which allow users to virtually walk or drive down streets, inspect structure from various angles, and otherwise interact with objects in virtual 3D space. These mapping systems can operate in applications designed specifically to provide digital maps, or in general-purpose applications such as web browsers, for example. In general, mapping systems can run on desktop, laptop, tablet computers, mobile phones, PDAs, and/or other computing devices.

SUMMARY

Camera pose optimization, which includes determining the position and orientation of a camera in three-dimensional space, is improved by detecting a higher-confidence reference object in the photographic imagery captured by the camera and using this object to increase consistency and accuracy of pose data. A higher-confidence reference object can be selected from among various objects depicted in the photographic imagery. A factor that may be considered in selecting a reference object is how easily the reference object can be recognized. According to an example technique of this disclosure, the selected higher-confidence reference object is geolocated using any suitable technique, such as 3D reconstruction or geographic surveying, for example. Those photographic images that depict the selected object are then identified and clustered together as a set of views of the selected object. In other words, because the selected images depict the same object, camera poses corresponding to these images are conceptually linked together to express intra-cluster similarity, so that corrections to one of the poses in the cluster likely affect the other poses in the cluster to retain consistency. The cluster of images is used in a larger pose optimization process, with the selected higher-confidence reference object operating as a factor that keeps the images of the selected reference object properly aligned.

In this manner, the technique improves relative accuracy by increasing internal consistency between poses of photographic images depicting the same reference object. Further, testing shows that these improvements in relative accuracy often provide a net improvement in absolute accuracy of poses as well.

More particularly, in one embodiment, a method for automatically correcting camera pose data includes obtaining, by one or more computing devices, images of a geographic area and image pose data that indicates, for each of the images, respective approximate location and orientation of a camera used to generate the image. The method further includes identifying, by the one or more computing devices, a reference object captured in at least one of the images and determining an estimated location of the reference object. Still further, the method includes selecting, by the one or more computing devices, from among the images, one or more images in which the reference object is captured and generating, by the one or more computing devices, corrected image pose data based at least in part on the one or more images and the estimated location of the reference object. Identifying the reference object may include selecting the reference object based on at least one of the (i) mobility, (ii) flexibility, (iii) size, and (iv) shape of the reference object.

In another embodiment, a system for automatically correcting camera pose data includes one or more computing devices and a non-transitory computer-readable medium that stores instructions. When the instructions are executed by the one or more computing devices, they cause the system to obtain images of a geographic area and image pose data that indicates, for each of the images, respective approximate location and orientation of a camera used to generate the image. The instructions further cause the system to obtain a reference object size threshold, identify a reference object captured in at least several of the images, determine an estimated location of the reference object, and generate corrected image pose data based at least in part on the estimated location of the reference object and those of the images that capture the reference object. When the instructions cause the system to identify the reference object captured in at least several of the images, these instructions also may cause the system to select the reference object based on at least one of the (i) mobility, (ii) flexibility, (iii) size, and (iv) shape of the reference object.

In yet another embodiment, a non-transitory computer-readable medium stores instructions for automatically correcting camera pose data. When the instructions are executed by one or more computing devices, they cause the one or more computing devices to obtain images of a geographic area and image pose data that indicates, for each of the images, respective approximate location and orientation of a camera used to generate the image. The instructions further cause the one or more computing devices to identify a reference object captured in at least several of the images, determine an estimated location of the reference object, and select, from the plurality of images, a group of images in which the reference object is captured. Further, the instructions cause the one or more computing devices to generate corrected data image pose data based at least in part on the group of images and the estimated location of the reference object. When the instructions cause the one or more computer devices to identify a reference object captured in at least several of the plurality of images, the instructions may cause the one or more computing devices to select the reference object based on at least one of the (i) mobility, (ii) flexibility, (iii) size, and (iv) shape of the reference object.

DETAILED DESCRIPTION

Overview

Figure 1:
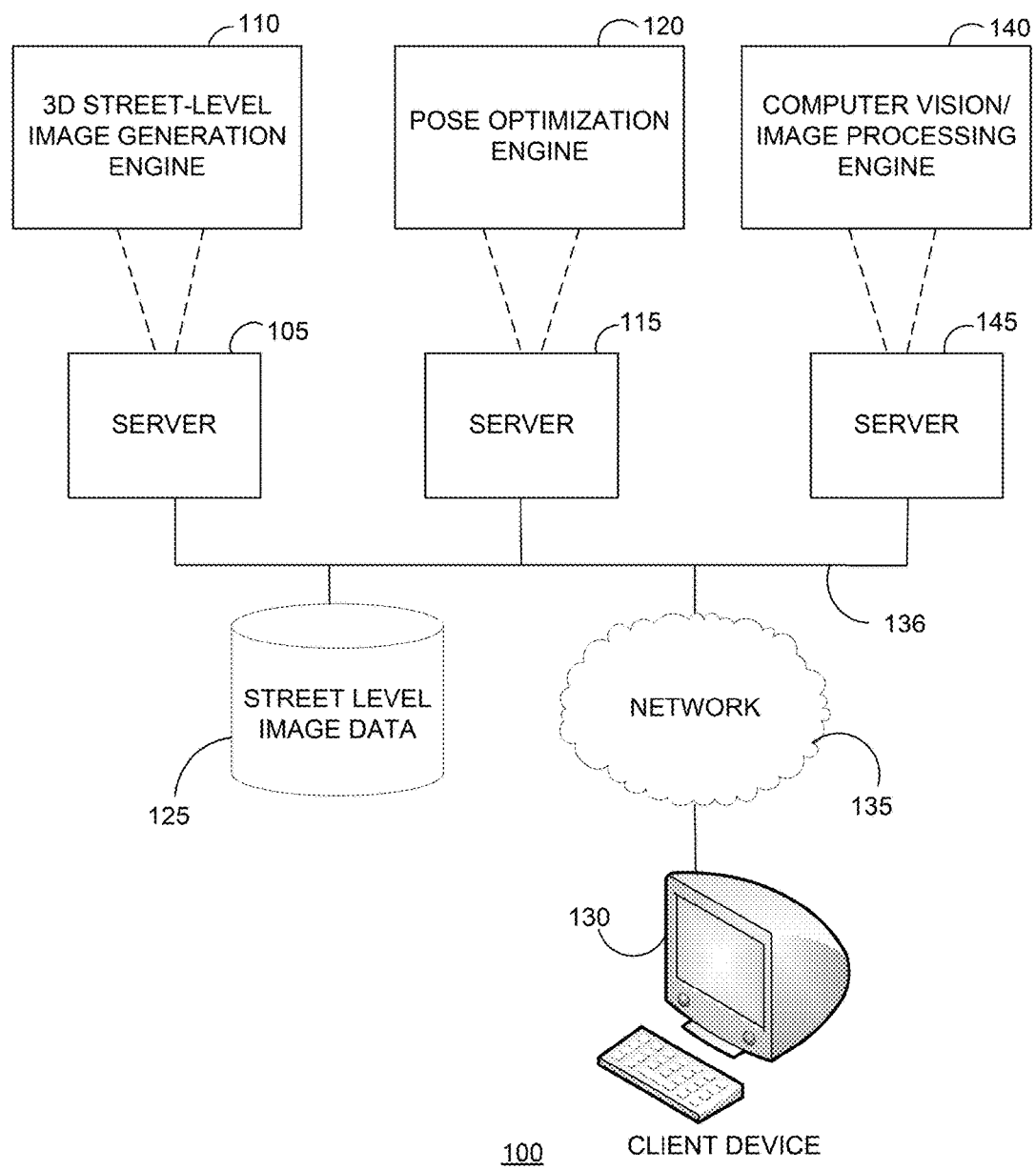
FIG. 1 is a block diagram of an example computing environment in which techniques for image location can be implemented, according to one embodiment.

To generate a 3D model of a real-world object, a mapping system can determine locations of numerous 3D points defining the surface geometry of the object to generate a so-called "point cloud." To this end, the mapping system can apply a 3D reconstruction technique, for example, to photographs of the world collected from various locations. The mapping system then can apply "flat" photographs, panoramic photographs, video feeds, etc. to the point cloud to generate photographically textured 3D models. Photographs used in 3D modeling and/or texturing of 3D models typically are geocoded, or tagged with geographic coordinates of the camera used to capture the photograph.

In some cases, photographic imagery used for 3D modeling is collected using a vehicle equipped with a set of synchronized cameras to collect street-level images of the area. The captured images can be geocoded using a geographic positioning technique such Global Positioning Service (GPS), for example. However, the existing geographic positioning techniques often yield inaccurate results.

To determine locations of objects in a geographic area, a camera or a set of synchronized cameras captures multiple photographic images (or simply "images") of various objects disposed in the geographic area. The camera can be installed on a vehicle, for example. Each image is stored on a computer-readable medium along with the corresponding pose data, which can include camera location and orientation in a 3D space. A computer vision system identifies a higher-confidence reference object captured in some or all of the images. The higher-confidence reference object may be selected based on whether it is stationary, fixed, and relatively large (e.g., larger than a configurable size threshold). Also, the higher confidence reference object may be selected in part based on whether the object is easily recognizable using computer vision techniques. The determination of a geographic location of a real-world object (e.g., a structure, a camera) can be referred to in this document as "geolocation."

Next, the system estimates the location of the higher-confidence reference object using any suitable technique. For example, the system can apply a structure-from-motion (SFM) technique to the images to estimate the location of the reference object. As another example, the system can receive the results of geographic surveying that indicate the position of the reference object.

Those images that depict the higher confidence reference object can then be selected from among the collected images for clustering. Using the selected higher-confidence reference object, the pose optimization system then aligns one or more common points within the cluster of images (such as those on the surface of the reference object) to further constrain subsequent processing of the image pose data and the estimated location of the higher-confidence reference object. The subsequent processing can include optimization, for example, in which each camera pose is expressed as a constraint. In this manner, the pose optimization system can improve the image pose data.

Additionally or alternatively, the pose optimization system can adjust and improve the estimated location of the reference object. For example, if image pose data was collected using a highly reliable positioning technique (e.g., sensor fusion that incorporates GPS data and data from various vehicle sensors), while the technique used to estimate the location of the reference object was generally less reliable, the pose optimization system can apply stronger constraints to the image pose data than to the location of the reference object. As a result, the estimate of the location of the reference object can change more than the image pose data.

In an example scenario, a camera mounted on a vehicle captures multiple pictures of an intersection that has a stop sign at a corner. The computer vision system may identify the stop sign as a suitable higher-confidence reference object because the stop sign is stationary (not moving, twisting, or swaying), fixed (attached to the ground), and relatively large (larger than a certain threshold value). Additionally, the stop sign is easily recognizable because of its color, size, dimensions, shape, text, and/or other visible features of a typical stop sign.

The pose optimization system then geolocates the stop sign and selects, from among the images, only those that show the stop sign at the intersection. Next, the system aligns the common points across the filtered multiple images to further constrain the image pose data and the estimated location of the stop sign. Using these constraints, the system may improve the image pose data for the multiple images and/or the estimated location of the stop sign.

Further, the vehicle in some cases drives in a loop or nearby and captures the same reference object multiple times. The trajectory of the vehicle can be "loop-closed" by aligning the one or more points of multiple images where the trajectory crosses itself. These aligned point(s) create additional constraint(s) on the pose data, which in turn improves the consistency and accuracy of the data.

Selection of Suitable Reference Objects

When identifying a higher-confidence reference object in a group of images, the pose optimization system in general attempts to improve the probability of matching points with accurate locations across multiple images. Specifically, once a reference object is identified, one or more points on the reference object in the first image are matched to one or more of the corresponding point(s) on the reference object in the second image. The determined location of the points in the first image should be the same as the determined location of the points in the second image. The probability of correctly determining that the same portion of an object is located at the same location in two images is improved when appropriate higher-confidence reference objects are used. In other words, selection of proper reference objects allows the pose estimation system to more accurately compute the position and orientation of the two images.

In one embodiment, a suitable higher-confidence reference object may be selected based on certain criteria. For example, if the reference object were stationary, there would be less variation in the position of the points of the object between a first and second image. Thus, a more suitable higher confidence reference object may be stationary. Additionally, there would also be less variation in the position of the points of the object from one image to another if the higher confidence reference object generally stayed at a fixed location. For example, a parked car would not be a good higher confidence reference object. While the parked car is stationary at a certain point in time, the car may not be in the same location at a later point in time. A traffic sign, on the other hand, generally is a good reference object because it is both stationary and attached to the ground. As a result, points on the stop sign can be identified at a point in time and more likely will be in the same location at a later point in time.

Also, it may be desirable for the higher-confidence reference object to maintain the relative accuracy of points located on the reference object. If so, objects that do not articulate, are not flexible, and/or are rigid may be desirable. For example, an articulating object, such as a backhoe arm, may not be a good higher confidence reference object. While the arm is fixed to the backhoe and may be stationary at a point in time, the relative accuracy of the points on the backhoe arm is not preserved because the backhoe arm may articulate. When the arm articulates, the location of the points on the arm may be different at a later point in time then at an earlier point in time. As a result, the relative accuracy of the points between images is not preserved.

In another example, a flag may not be a good higher-confidence reference object due to its lack of rigidity. Specifically, while a flag at rest is stationary and fixed, a flag subjected to outside forces (e.g. wind) will no longer be stationary. The points selected on the flag while the flag is at rest will be in different locations when the flag is flapping in the wind. As a result, if a flag is used as a higher confidence reference object, the relative accuracy of points on the flag is unlikely to be preserved between multiple images.

Additionally, the higher-confidence reference object may be easily recognizable. An easily recognizable reference object is more likely to be correctly selected across multiple images. Several traits can affect how easily recognizable a reference object is. These traits may include size, shape, geometry, configuration, dimensions, color, brightness, symbols, text, location, and/or other traits that can improve recognition.

With respect to size, it may be preferable for a higher confidence reference object to be relatively large. In one embodiment, a higher confidence reference object may be larger than a predetermined size threshold. For example, multiple images may include a larger first traffic sign and a smaller second traffic sign. In one embodiment, the first traffic sign is selected as a higher confidence reference object because it exceeds a predetermined size threshold. Additionally, the second traffic sign may not be selected as a higher confidence reference object because this sign does not exceed the predetermined size threshold.

In another example, other factors may also contribute to selecting the first traffic sign as the higher-confidence reference object. For example, if the first traffic sign were a stop sign, the shape of the stop sign (octagon), color (red with white letters), text (white letters saying "STOP"), location (nearby roads) and/or other traits and/or a combination of the aforementioned traits may improve recognition. As another example, if the first traffic sign were a pedestrian crossing sign, the symbols on the sign (people walking), along with the shape of the sign (diamond), color (yellow background with black symbols), and/or other properties (or a combination of these properties) may also improve recognition. Further examples of desirable higher confidence reference objects are discussed with reference to FIGS. 3A-4E.

Example Computing Environment

FIG. 1 displays an example pose optimization computing environment 100, in which the accuracy of geolocating images can be improved using the techniques of this disclosure. Environment 100 includes one or more server(s) 105, 115, and 145, 3-D street level image generation engine 110, pose optimization engine 120, computer vision/image processing engine 140, street level image data storage 125, a client device 130, a network 135, and a communication link 136. In some embodiments, the environment 100 may include more, fewer, and/or different servers, client devices, computing engines, and/or data types than those shown in FIG. 1. Although FIG. 1 shows a particular configuration for the various components of environment 100, different network configurations are possible.

An instance of a 3-D street level image generation engine 110 may operate on server(s) 105. In operation, server(s) 105 provide(s) three-dimensional interactive maps in response to a request by client device 130 via the network 135. To accommodate the request by the client device 130, server(s) 105 may rely on engine 110 to generate three-dimensional interactive maps based on street level image data and image pose data, which server(s) 105 may request from server(s) 115. Server(s) 105 may also request image data and/or image pose data from street level image data storage 125. Server(s) 105, server(s) 115, and street-level image data storage 125 may communicate with each other via communication link 136.

The environment 100 also includes street level image data storage 125 which stores street-level image data. The image data includes images for one or more geographic areas. A geographic area may include a street, intersection, sidewalk, landmark, building, bridge, body of water, and/or other object with a geographic location. The images may be street-level photographs of the geographic area. The images stored at storage 125 may be associated with information (e.g., the images may be "tagged") indicating the location from which the image was captured. The location indication may be in any appropriately searchable form including, by way of example and not limitation: latitude and longitude, intersection, street address, zip code, distance and direction from a known, fixed point, etc. The association (e.g., by metadata) of geolocation information with a file (e.g., a digital image) can be referred to herein as "geotagging." A file (e.g., an image file) having associated metadata indicative of a geolocation (e.g., a geolocation of the camera at the time the image was captured) is said to be "geotagged."

The database of digital photographic images may be populated with geotagged images recorded by, for example, a digital camera with a GPS unit. In some embodiments, the metadata associated with the image may include more information than just a simple location of the camera at the time an image was captured. For example, the metadata may include an indication of the direction the camera was facing when the image was captured, the focal point of the lens, the height and/or angle of the camera with respect to the ground, the zoom level of the lens, the distance from the camera to nearby objects, etc. In some embodiments, the associated information may include camera pose information. Camera pose information may include the location and orientation of the camera at the time photograph was taken.

The images and metadata may be captured, for example, by a set of cameras mounted on a moving vehicle so as to provide (and capture) a 360-degree view as vehicle moves. Each time a set of images is captured, which may be configured based on a time interval or a distance interval, the images are geotagged (e.g., using information from a GPS receiver) and stored. Additional information, such as information from a laser rangefinder or information about the vehicle speed and direction, may also be stored as associated with the images. An application specific interface (API) may allow various programs to access the data stored in the database.

Where storage 125 includes panoramic imagery, each panoramic image may include, or be constructed from, a number of individual images captured and combined to create a panoramic image. The panoramic image may be captured using any suitable technique. For example, the panoramic image may be captured by a special image capture system mounted on a vehicle, (e.g., a bicycle, an automobile, a motorcycle, a cart, a tricycle, a snowmobile, etc.), or, perhaps, carried in a backpack. The image capture system may include a sensor pod having a number of cameras, each fixed with respect to the sensor pod and collectively capturing a 360-degree view. In an embodiment of the image capture system, one or more GPS units operate to determine the location of the image capture system as each panoramic image is captured, and data from the GPS units is stored as metadata with the images in the data store.

In some embodiments, the storage 125 may also include street-level images of geographic areas uploaded by individual users, such as client device 130. In this scenario, server(s) 105 and storage 125 may take steps to maintain the privacy of the user and/or client device uploading the street level images. For example, the user may receive a temporary identifier that expires shortly after an upload session. Alternatively, the server(s) 105 and/or storage 125 may mask, remove, and/or modify the identity of the user and/or client device before receiving uploaded images. Additionally, server(s) 105 may also scan the street level images stored at storage 125 to remove identifying information of any people pictured in the stored images. For example, if an image contains tags and/or labels associated with people in the street-level images at storage 125, server(s) 105 may remove the tags and/or labels. Alternatively, the server(s) 105 may delete the image from storage 125.

Additionally, one or more range scanners (e.g., laser range scanners) may measure the distance from the sensor pod to various objects captured in the panoramic images. Still further, a one or more antennas and receivers may scan for wireless signals in the area, including mobile telephony signals, GPS signals, and/or wireless network signals (e.g., IEEE 802.11, IEEE 802.16, etc.). The image capture system may also include various computer equipment, including one or more processors, memory subsystems, displays, input devices, etc., which may function to control the sensor pod, capture and store images and metadata, transmit the stored images and metadata to another device (e.g., the data store), etc.

The captured image data in storage 125 may include a series of camera poses that are collected along the path, or a pose run, that corresponds to the trajectory of the vehicle. After being captured, the photographs and associated information, including camera poses, may then be uploaded to the street level image data storage 125. The images and associated information, including pose data, stored at storage 125 may be used by server(s) 105 and engine 110 to provide on demand street-level views of geographic regions. However, because GPS coordinates are not always accurate, server(s) 115 and pose optimization engine 120 may adjust and improve the pose data of one or more images at storage 125.

Server(s) 105 and engine 110 use the street-level image data stored at storage 125 to provide interactive three-dimensional maps to client device 130 over network 135. In some embodiments, the engine 110 uses 3D geometry reconstruction techniques to generate interactive three-dimensional maps based on the stored street level image data at storage 125. The 3D geometry reconstruction techniques may include using the SFM technique, for example. Alternatively, other 3D reconstruction techniques may be used by engine 110 and server(s) 105 to provide three-dimensional interactive maps to a client device 130.

Client device 130 allows a user to receive interactive three-dimensional maps from the server(s) 105. Client device 130 accesses maps from the server (s) 105 via the network 135. The client device may be a desktop, laptop, personal computer (PC), mobile phone, smart phone, PDA, tablet computer, and/or other computing device. Although FIG. 1 shows one client device 130, in other embodiments, more than one client device can access interactive three-dimensional maps from server(s) 105 via the network 135.

The network 135 allows one or more client devices 130 to access map data from a server(s) 105. In some embodiments, the network 135 may be the Internet, an intranet, or any other suitable type of a network. Also, in some embodiments, the communication link 136 may be an Ethernet link or another type of a wired or wireless communication link.

Environment 100 also includes server(s) 115 and pose optimization engine 120. An instance of engine 120 may run on server(s) 115. Server(s) 115 and pose optimization engine 120 adjust the pose data and/or associated information of the street level image data. These adjustments allow server(s) 105 and engine 110 to provide more accurate interactive three-dimensional maps to the client device 130 via network 135.

Server(s) 115 provides updated pose data associated with images stored at storage 125 to server(s) 105, possibly in response to a request from server(s) 105. Server(s) 115 may rely on pose optimization engine 120 to update the associated pose data. Server(s) 115 may request street level image data and image pose data from storage 125 to update the pose data. Server(s) 115 may send the updated pose data to storage 125 for storage. Communication link 136 may facilitate the above communications and data exchanges.

In one embodiment, the server(s) 115 and 145 receive(s) street level images and image pose data from storage 125. The computer vision engine 140 may then identify a higher-confidence reference object located in some of the received images. The optimization engine 120 may determine an estimated location of the higher confidence reference object. Next, those of the received images that depict the identified higher confidence reference object are selected. Based on the selected images, the engine 120 can generate additional object-in-image pose constraints for an optimization framework to determine improved data. In some embodiments, the selected images are aligned to one another to add further pose constraints to improve the process of determining improved pose data.

For example, the engine 120 may determine corrected image pose data for the selected images. Alternatively, the engine 120 may correct the estimated location of the higher confidence reference object. As yet another alternative, the engine 120 may correct both the image pose data for the selected images and the estimated location of the higher confidence reference object. This improved data may then be sent by server(s) 115 to server(s) 105 and/or storage 125. Because the disclosed methods rely on higher confidence reference objects, as opposed to small feature detection used by current methods, the robustness and accuracy of camera pose data determined by the disclosed methods are improved. Higher confidence reference objects are discussed in more detail below.

In an example implementation, the constraints that affect pose data correction may be expressed as terms in an optimization framework, where the various terms define constraint violation penalties with different strengths, and where the optimization goal is to minimize the total sum of term penalties. A set of pose samples is then solved for so as to optimally satisfy the constraints using an optimization scheme such as a local search method (e.g., gradient descent, conjugate gradient method, the Levenberg-Marquardt method) while applying the optimization terms. For example, in an embodiment, the reported locations included in the pose samples are expressed as a relatively weak optimization term, whereas a relative translation term is expressed as a relatively strong optimization term. Additional terms, such as a relative rotation term, may be used to accurately and efficiently correct pose run data.

Engine 120 may estimate the location of the reference object before adjusting its estimate based on the received image pose data. In one embodiment, the engine 120 estimates the location of the reference object based on received survey data. The received survey data may accurately locate the reference object as a result of geographic surveying of the geographic area.

In one embodiment, the reference object is estimated based on differential global positioning system (DGPS) techniques. A network of GPS base stations having precise surveyed positions may develop highly accurate positioning corrections for a set of satellite signals. The positioning corrections are generated by performing a comparison, or optimization, between the positioning results of base station positioning modules and the surveyed base station positions. A portable device at a location near the reference object attempting to generate a position fix can apply the base station generated corrections to improve geopositioning. This improved geopositioning may then be used by engine 120 to determine an estimated location for the higher confidence reference object.

In another embodiment, the reference object location is estimated based on GPS data. In yet another embodiment, the reference object location estimate relies on local positioning service (LPS) data such as an identifier of a proximate Wi-Fi hotspot, for example. In general, the reference object location can be estimated based on a suitable indication of a location for the reference object.

Example Pose Estimation and Optimization System

Figure 2:
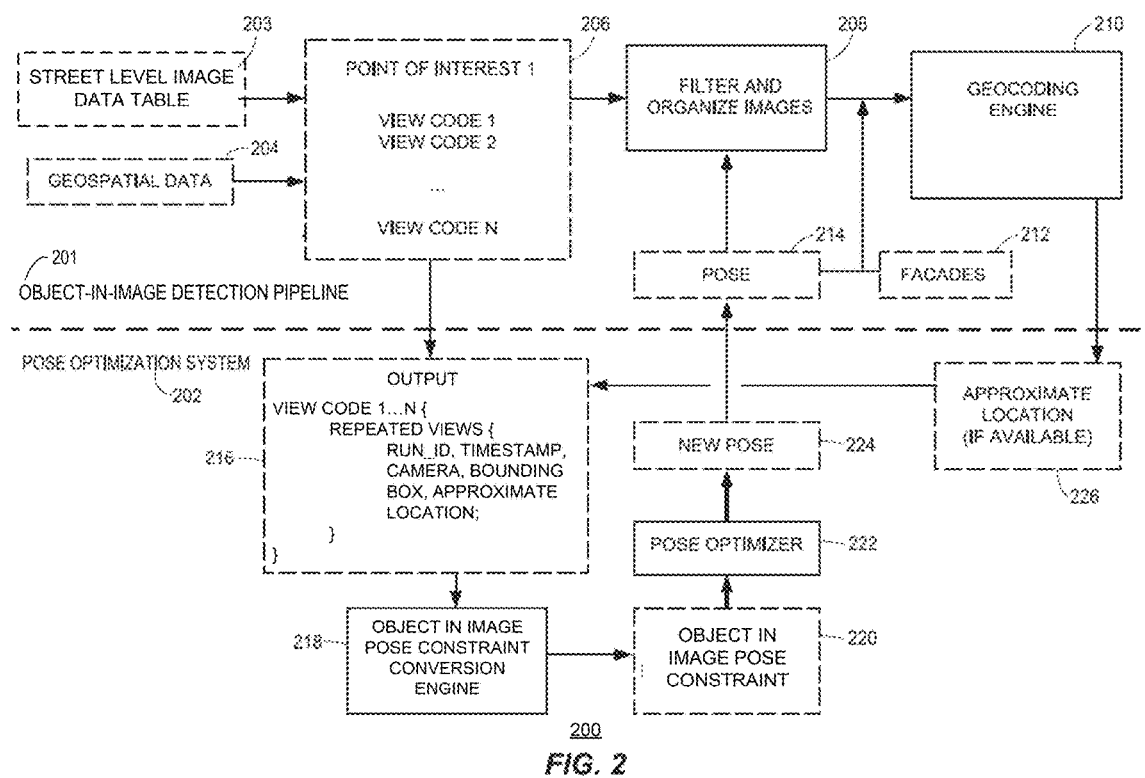
FIG. 2 is a block diagram of an example pose estimation and optimization system, which can be implemented in the system of FIG. 1.

FIG. 2 displays an example pose estimation and optimization system 200, which includes an object-in-image detection pipeline 201 and a pose optimization system 202. In an example embodiment, the pipeline 201 and the system 202 are implemented in a network server, such as the server(s) 115 of FIG. 1. As a more specific example, the pose optimization engine 120 operating in the server(s) 115 can include both the pipeline 201 and the system 202. More generally, however, the pipeline 201 and the system 202 can be implemented in the same server, separate servers, or more than two servers that implement individual components of the pipeline 201 and the system 202.

The pipeline 201 uses some or all of street level image data table 203, geospatial data 204, pose data 214, and façade data 212. Pipeline 201 filters and organizes images 208 for a geocoding engine 210. Pipeline 201 also provides point of interest (POI) view codes 206 to the pose optimization system 202.

In an example implementation, the pose optimization system 202 includes an object-in-image pose constraint conversion engine 218 and a pose optimizer 222. The engine 218 relies on a view codes output file 216 to generate object-in-image pose constraints 220. The constraints 220 can be used by pose optimizer 222 to generate new pose data 224, which is then forwarded to the pose estimation pipeline 201. The view codes output file 216 may use an approximate location 226 of a higher confidence reference object, if it is available.

The street-level image data table 203 includes multiple cells, each of which includes one or more view codes. In one embodiment, a view code is an image of a geographic area. In one embodiment, a view code is an image of a higher confidence reference object type. The table 203 is organized such that each column contains a point of interest (POI) type while each row has an image identifier (ID). In one embodiment, different types of higher confidence reference objects may include parking signs, traffic signs, business logos, business signs, street numbers, street signs, fire hydrants, poles, and/or other object types that may be of interest to a client device 130 interacting with a three-dimensional map. In one embodiment, the image identifier row identifies a certain panoramic image. Thus, each column contains multiple rows of cells containing one or more images associated with the POI type designated for that column. The street level image data table 203 could include any number of appropriate rows, columns, and/or cells. The table 203 may categorize cells by different rows and/or columns than those described.

One or more POI view codes 206, which are view codes associated with a point of interest, are generated based on geospatial data 204 and street level image data table 203. The view codes 206 may include one or more view codes. View codes 206 may include any appropriate number of view codes (N). A POI may be a geographic area, in one embodiment. In one embodiment, a POI refers to a point or an object in which the client device 130 is interested. These points of interest could include parking signs, traffic signs, business logos, business signs, street numbers, street signs, fire hydrants, poles, a whole class of signs, and/or other object types. In another embodiment, a POI may refer to a class of objects, e.g. all street signs.

In one scenario, the POI type (column) is specified to be a stop sign. The image identifier in this scenario indicates a panoramic image generated for a specific intersection. In the same scenario, the cell specified by the stop sign POI and intersection panoramic image contains multiple view codes (images) of the stop sign at that intersection. This situation is illustrated in FIGS. 3A-4E. However, in some embodiments, there may be multiple stop signs at an intersection. As a result, the cell designated for stop signs at an intersection in table 203 may include view codes 206 of all of the different stop signs at the intersection. In some scenarios, view codes (cell) for a POI (column) in an image (row) may contain view codes at different angles (e.g., the back of street signs) and at different times of the POI.

View codes 206 associated with the POI are then filtered and organized 208 by the pipeline 201. Additionally, each view code may include pose data associated with that view code. To improve the associated pose data for each view code, each view code and its associated pose data may be sent from the pipeline 201 to the pose optimization system 202.

The pipeline 201 may filter and organize images 208 to send to geocoding engine 210. The images received for filtering and organizing are view codes 206. Additionally, updated pose data 214 may be associated with the received view codes 206. As a result, this pose data 214 may also be used by the pipeline 201 to filter and organize the received images 208. In one embodiment, the pipeline 201 filters the images to exclude view codes 206 that are of a poor quality. For example, view codes 206 that are blurry may be cleaned up, filtered, and/or removed. Additionally, steps may be taken to ensure the monotonicity of numbers on a street, checking the existence of addresses, etc. within the received view codes 206.

Furthermore, filtering may also include steps to reject certain view codes due to inconsistencies with pose data. In another embodiment, view codes 206 may be clustered to only include view codes of a particular geographic area that also include an identified higher confidence reference object. The clustered view codes may also be associated with updated pose data 214 by pipeline 201. Once complete, the pipeline 201 may then send the filtered and organized images (view codes) 208 to geocoding engine 210. The pipeline 201 may also send the associated updated pose data 214 to geocoding engine 210. Also, pipeline 201 may send façade data 212 to geocoding engine 210. In some embodiments, the façade data 212 is associated with the view codes 206, the filtered and organized images 208, and/or the associated pose data 214.

The geocoding engine 210 may rely on façade data 212, updated pose data 214, and the received filtered and organized images 208 to generate geocodes. The engine 210, in one embodiment, receives clustered images 208 relating to a POI. The engine 210 also receives façade data 212 and associated pose data 214 for the images 208 for a POI. Engine 210 then uses all of this data to generate a geocode for a single view of the POI. In one embodiment, the engine 210 generates a geocode by triangulating the façade data 212 with the clustered images 208. The engine 210 may then use the geocode to send an approximate location 226 of the POI to the pose optimization engine 202. Additionally, the engine 210 may determine a location for a higher-confidence reference object contained in the received images 208. The approximate location 226 of the higher confidence reference object may also be forwarded to the optimization system 202.

The pipeline 201 may receive updated pose data 214 from the pose optimization system 202. The received updated pose data 214 may be associated with view codes 206. The updated pose data 214 may be more accurate than the initially estimated pose data for view codes 206 because of the higher confidence reference object approximate location 226 used by the pose optimization system 202 to determine the updated pose data 214.

The pose optimization system 202 receives one or more view code output files 216 from the object-in-image detection pipeline 201. In one embodiment, each file 216 includes a buffer description of all of the view codes 206 for a POI (e.g., from the table 203) in a geographic area (row from the table 203), which results in all of the view codes 206 associated for the designated cell from table 203. For example, if the POI type is stop signs, and the geographic area is an intersection, and the intersection only had one stop sign, then the file 216 includes buffer descriptions of all the view codes 206 for the stop sign at that intersection. If, instead, the intersection had multiple stop signs, then the file 216 would include buffer descriptions of all the view codes 206 for all of the stop signs at that intersection.

Each buffer description for a view code 206 has one or more associated parameters. These parameters include the view code identifier (view code ID) trajectory run identifier (run_ID), timestamp, camera identifier (camera), bounding box data (bounding box), and approximated positions objects. The parameter trajectory run identifier identifies on which trajectory run the view code was captured. The parameter timestamp explains at what time the view code was secured while the parameter camera identifier describes which camera captured the view code.

Also, the parameter bounding box data contains data relevant to the bounding box for that view code. For each view code, a bounding box is defined as the pixels surrounding the higher confidence reference object located in the geographic area. The bounding box may be used to enhance processing by the pipeline 201 and system 202. The bounding box may help describe the location of the higher confidence reference object within the image. The bounding box data may include coordinates, size, and/or other data relevant to the bounding box. In some embodiments, the file 216 may include more, fewer, and/or different parameters for each view code.

The file 216 may also include an approximate location 226 of the geographic area and/or an approximate location 226 of a higher confidence reference object visible within one or more view codes described in the file 216. Alternatively, the approximate location 226 of the geographic area and/or the higher confidence reference object may be forwarded to an object-in-image pose constraint conversion engine 218 to help generate one or more object-in-image pose constraints 220.

The view code output file 216 received by system 202 from pipeline 201 is then sent to the object-in-image pose constraint conversion engine 218. Engine 218 converts the output file 216 into an object-in-image pose constraint 220. The object-in-image pose constraint 220 is meant to represent a physical object in the real world. Given this, the constraints may contain information about the physical object, such as orientation, location, and/or dimensions for the physical object. This information can be used by optimizer 222 to estimate and constrain camera pose data for the physical object. This in turn would improve the pose data associated with the view codes 206 used to generate the object-in-image pose constraint 220. In one embodiment, the engine 218 may parse the file 216, identify relevant data within the file 216, and process the identified relevant data to generate the object-in-image pose constraint 220 for use by optimizer 222.

The constraint 220 is then sent to pose optimizer 222. The optimizer 222 uses the constraint 220 to generate updated pose data 224. The optimizer 222 may rely on different pose optimization methods and object-in-image pose constraints 220 to generate updated pose data 224. In some embodiments, the optimizer 222 may use a sigmoid or an S-type loss function. These functions provide the benefit of allowing the optimizer to ignore view codes of other entities that were incorrectly assigned. Another benefit is that view code bounding box errors on the low end are also ignored. These benefits improve the optimization of the pose data. The updated pose data 224 is associated with the received view code buffer descriptions for output file 216. This updated pose data 224 is then forwarded by system 202 to pipeline 201 for use by geocoding engine 210.

In some embodiments, the pipeline 201 and system 202 may use and/or generate different data than that displayed and described. Also, the pipeline 201 and system 202 may include more, fewer, and/or different engines than those shown and described. Further, the pipeline 201 and the system 202 may conduct more, less, and/or different steps than those described. Also, the pipeline 201 and system 202 may execute steps in a different order than the order shown or described.

Example Pose Optimization Scenarios

FIGS. 3A-4E illustrate how the techniques of this disclosure may be applied to pose data. More specifically, an example trajectory of a camera travelling in a loop through several city blocks is discussed with reference to FIGS. 3A and 3B. Another example trajectory of a camera through an intersection is discussed with reference to FIGS. 3C and 3D. Example photographs or snapshots captured at different points along this trajectory are discussed with reference to FIGS. 4A-4E. Camera pose correction operations described with reference to FIGS. 3A-4E can be implemented in the object-in-image detection pipeline 201 and/or the pose optimization system 202, for example.

Figure 3A:
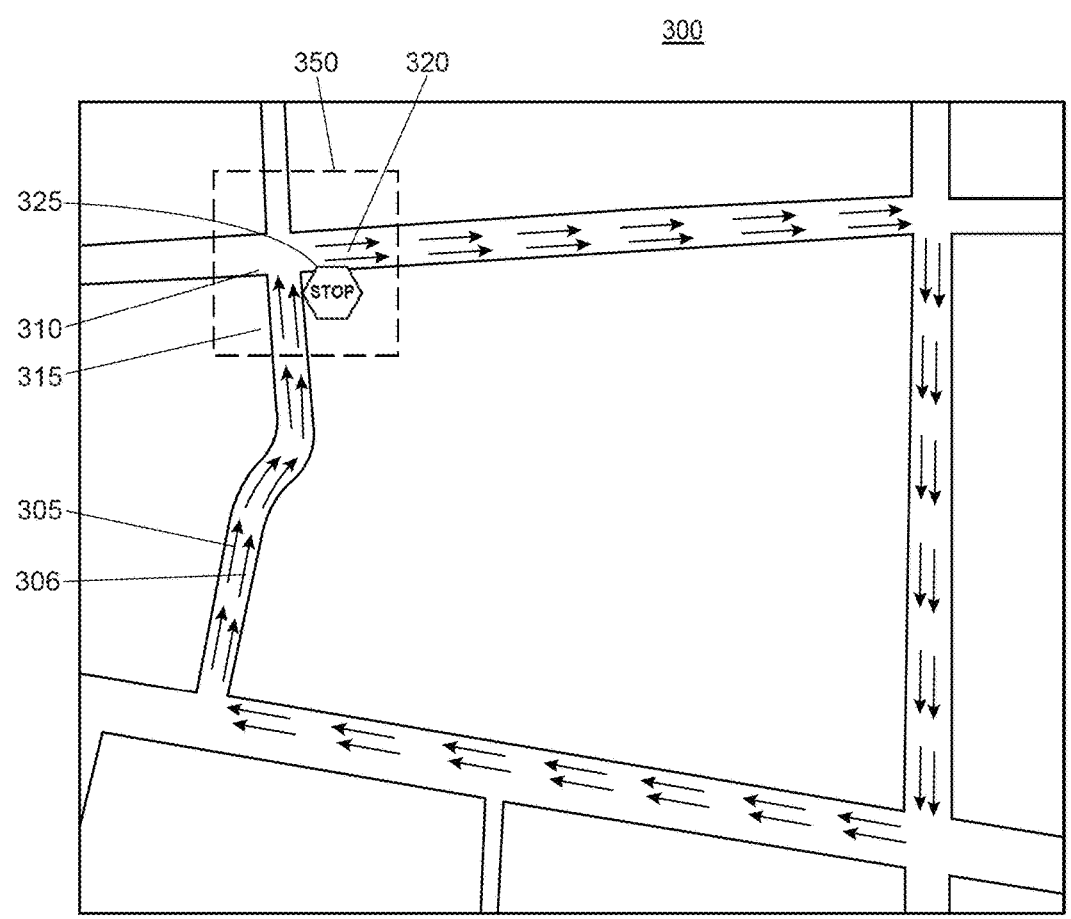
FIG. 3A illustrates the trajectory of a camera that passes past a stop sign multiple times, according to one scenario.

FIG. 3A depicts an example environment 300 in which the trajectory of a camera can be constructed. In particular, FIG. 3A schematically depicts a first image capture run 305, a second image capture run 306, an intersection 310, a first street 315, a second street 320, and a stop sign 325. The first street 315 intersects the second street 320 at intersection 310. The stop sign 325 is visible to traffic moving along the first or second trajectory runs (305, 306) on first street 315 towards second street 320. Environment 300 also includes a zoomed in view (350) of the intersection 310.

Figure 3B:
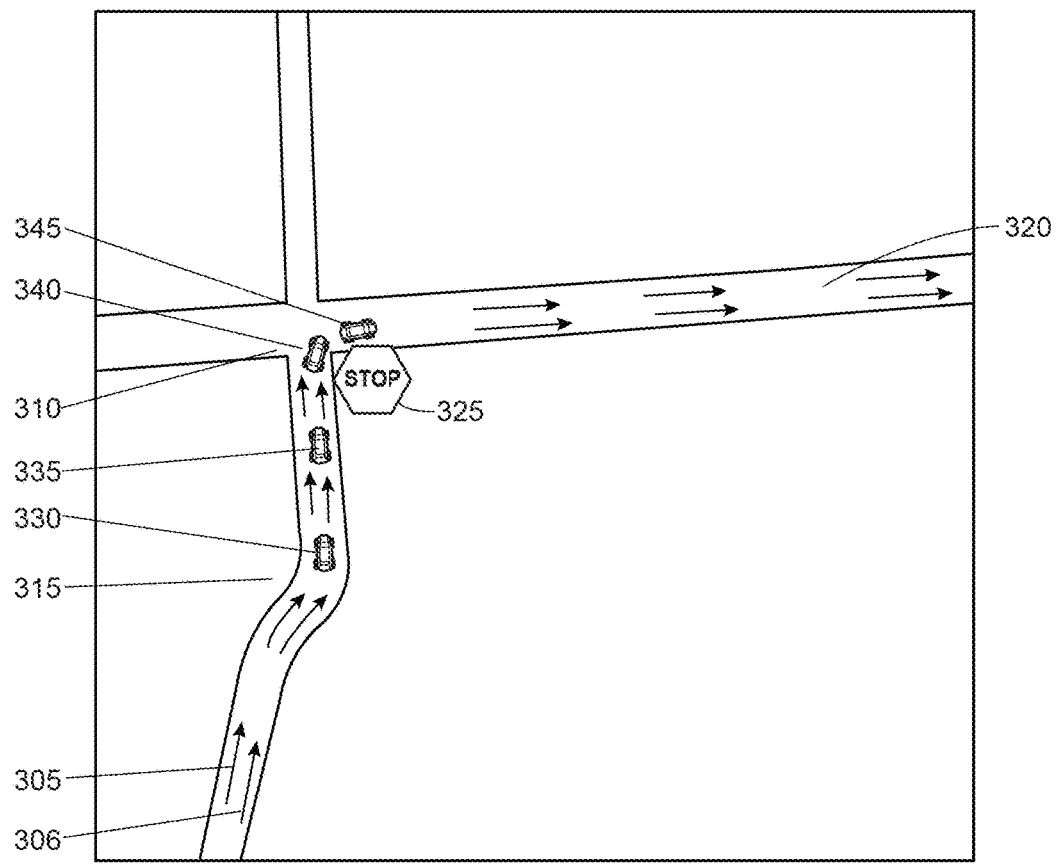
FIG. 3B is a zoomed-in view of a portion of the trajectory of FIG. 3A.

FIG. 3B displays a zoomed in-view 350 of the vehicle trajectory environment 300 at intersection 310. The view 350 displays the first image capture run 305, the second image capture run 306, the intersection 310, the first street 315, the second street 320, a first snapshot location 330, a second snapshot location 335, a third snapshot location 340, and the fourth snapshot location 345.

Figure 3C:
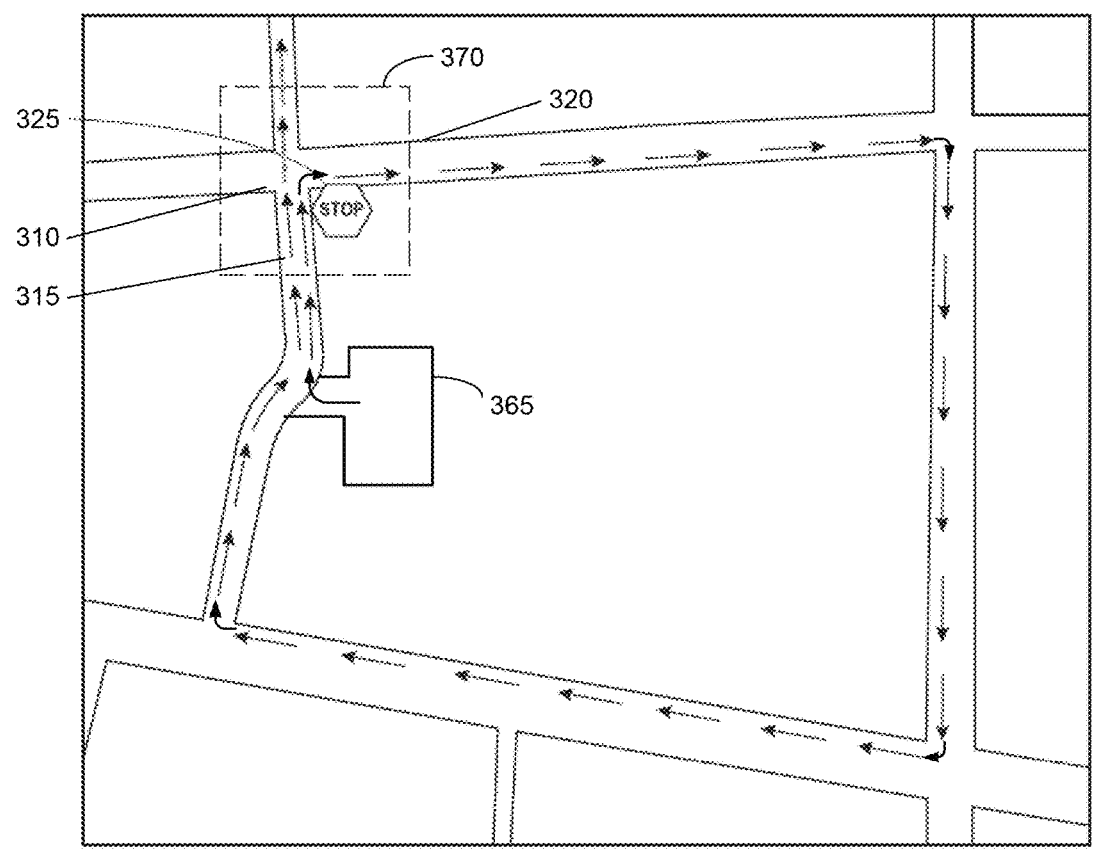
FIG. 3C illustrates another scenario for a trajectory of a camera that passes a stop sign.

FIG. 3C depicts another example environment 360 in which the trajectory of a camera may be constructed. In particular, FIG. 3C schematically depicts a capture run that begins in parking lot 365, turns onto first street 315, through intersection 310 and onto second street 320, passing stop sign 325. In contrast with FIG. 3A, the trajectory in FIG. 3C makes only one run around the block, and then proceeds on first street 315 through intersection 310. Environment 360 also includes a zoomed in view 370 of the intersection 310.

Figure 3D:
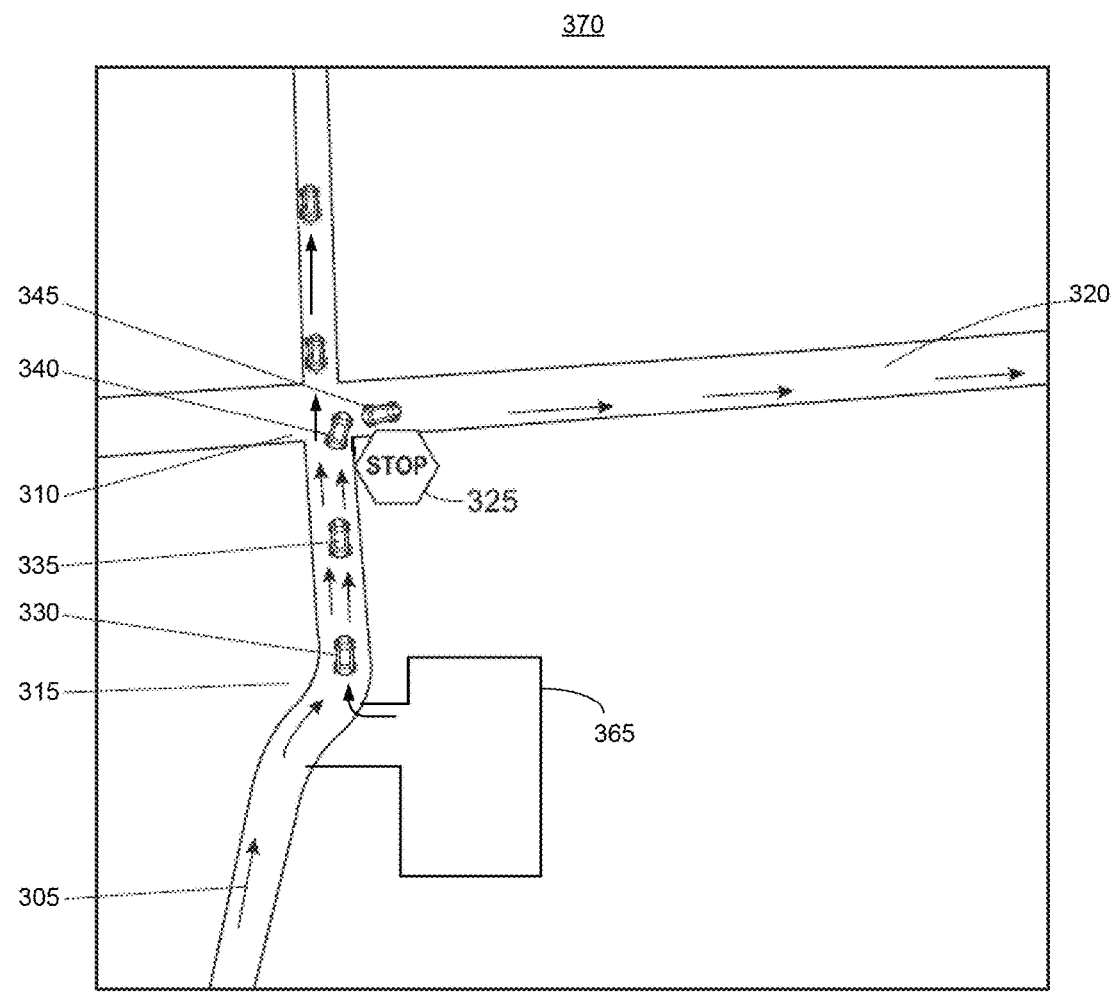
FIG. 3D is a zoomed in view of a portion of the trajectory of FIG. 3C.

FIG. 3D displays a zoomed in view 370 of intersection 310 in the vehicle trajectory environment 360. The view 370 displays the capture run, which begins in parking lot 365, turns onto first street 315, through intersection 310 and onto second street 320, passing stop sign 325. In addition, the view 370 shows a first snapshot location 330, a second snapshot location 335, a third snapshot location 340, and the fourth snapshot location 345.

As illustrated in FIGS. 4A-4D, the snapshot locations 330, 335, 340, and 345 include an image of the stop sign 325 and, where possible, the intersection 310. All four snapshot locations, 330, 335, 340, and 345 occur along the first and/or second image capture runs (305, 306). The first snapshot occurs on first street 315 facing stop sign 325. The second snapshot 335 also occurs on first street 315 facing stop sign 325. The second snapshot 335 is taken further along the first (or second) image capture run 305 (or 306) than the first snapshot 330. In other words, the second snapshot location 335 is closer to the second street 320 than the first snapshot location 330. The third snapshot 340 is taken while on street 315 at, or near, intersection 310. The third snapshot 340 is closer to the second street 320 than the second snapshot location 335 and the first snapshot location 330. The fourth snapshot location 345 is taken from the second street 320 at, or slightly past, intersection 310.

Figure 4A:
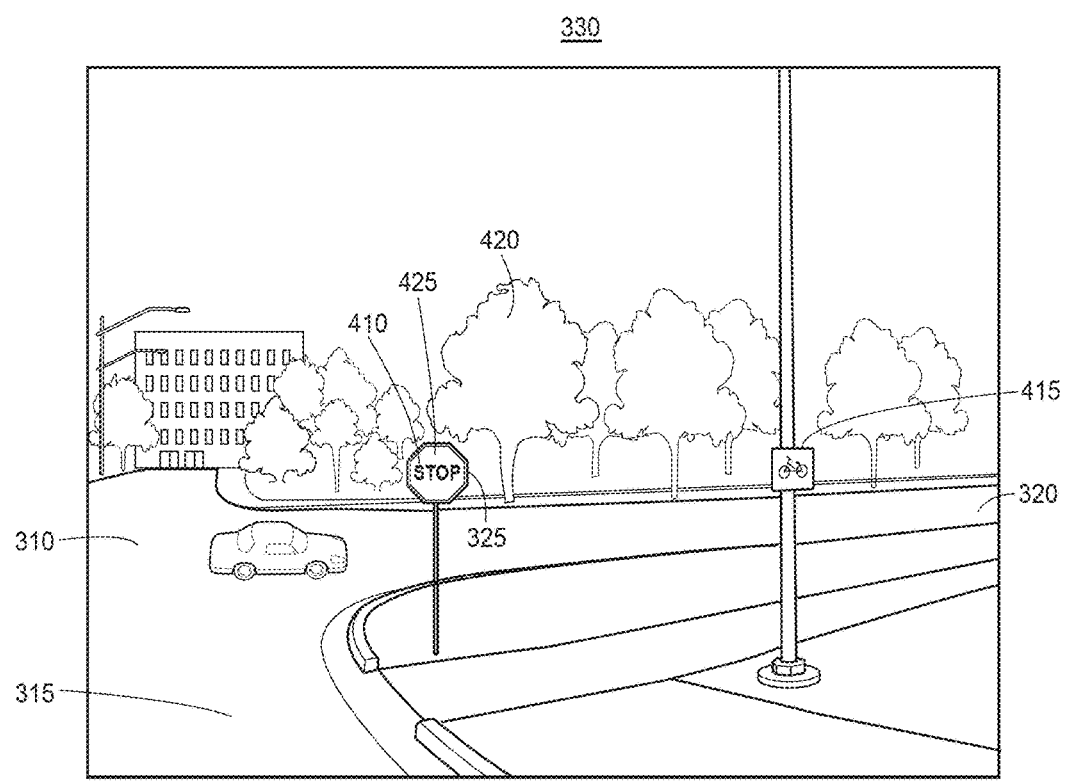
FIG. 4A illustrates an example photograph or snapshot of an intersection with a stop sign that can be used as a higher-confidence object, in one scenario.

More specifically, FIG. 4A displays the first snapshot at location 330. The first snapshot 330 shows the intersection 310, the first street 315, the second street 320, and the stop sign 325. The snapshot 330 also includes a traffic sign 415 and a tree 420. The stop sign 325 is located in a first position 410 in snapshot 330. The front surface 425 of stop sign 325 is visible in snapshot 330.

Figure 4B:
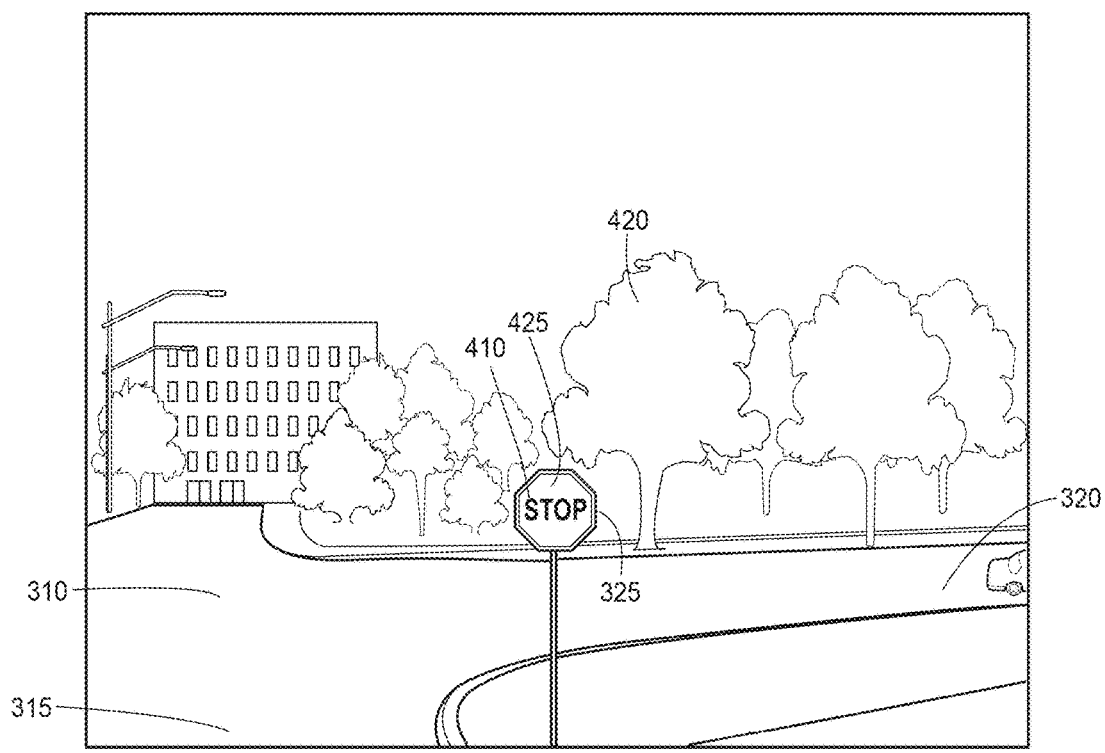
FIGS. 4B-D illustrate additional photographs of the intersection of FIG. 4A.

FIG. 4B displays the second snapshot at location 335. The second snapshot 335 displays the intersection 310, the first street 315, the second street 320, and the stop sign 325. The snapshot 335 also includes the tree 420. The stop sign 325 is located in the first position 410 in snapshot 335. The front surface 425 of stop sign 325 can be seen in snapshot 335.

Figure 4C:
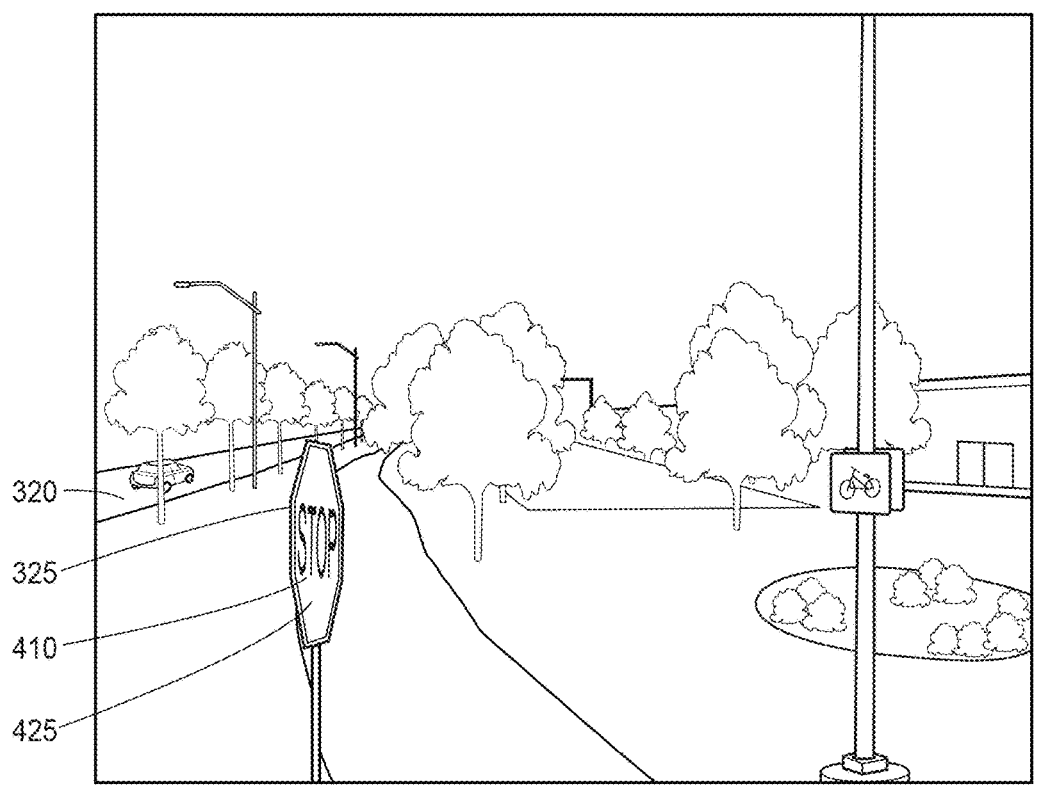

FIG. 4C shows the third snapshot at location 340. The third snapshot 340 displays the second street 320 and stop sign 325. The stop sign 325 is at the first position 410 in the snapshot 340. The front surface 425 of the stop sign 325 is shown in snapshot 340.

Figure 4D:
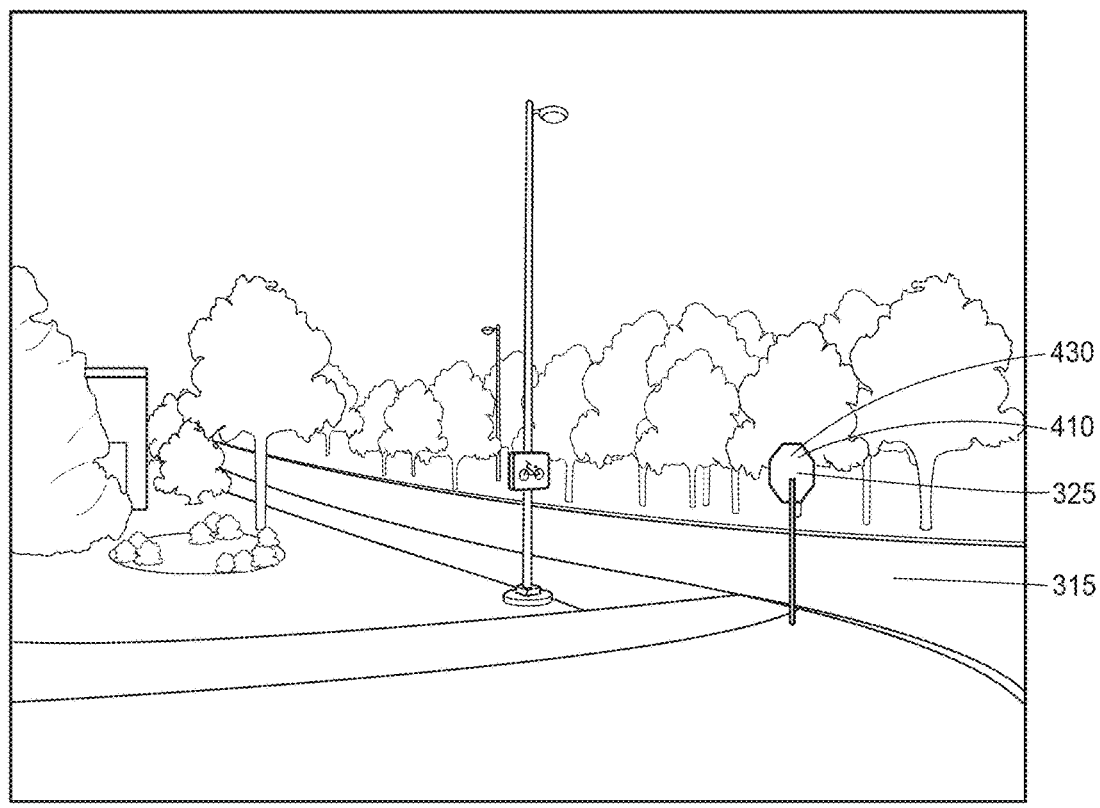

FIG. 4D shows the fourth snapshot at location 345. The fourth snapshot 345 shows the first street 315 and the stop sign 325. The stop sign 325 is at the first position 410 in snapshot 345. The rear surface 430 of the stop sign 325 is visible in snapshot 345.

Figure 4E:
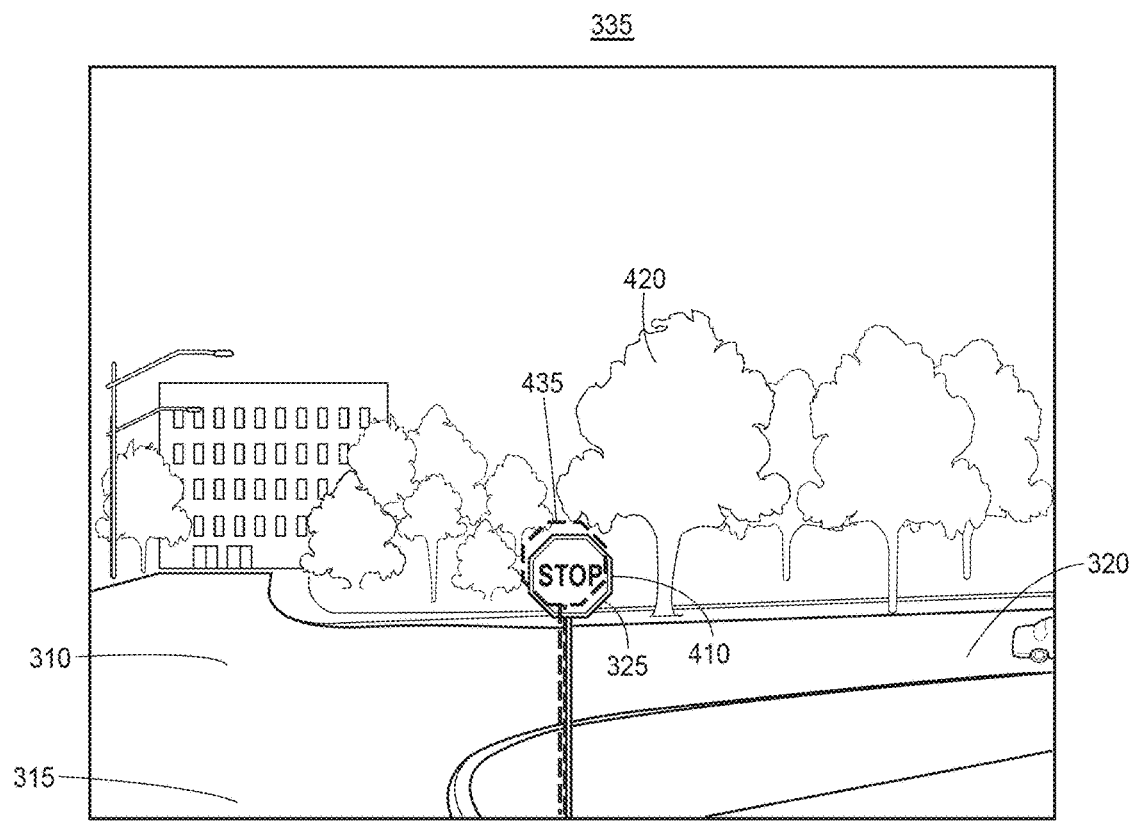
FIG. 4E is a zoomed in-view of one of the photographs of the intersection of FIG. 4A.

FIG. 4E is a zoomed in view 401 of the second snapshot at location 335. The zoomed in view 401 includes intersection 310, the first street 315, the second street 320, and the stop sign 325. The view 401 also includes tree 420. The stop sign is shown at the first position 410. A second position 435 for the stop sign 325 is also displayed in the view 401.

However, in some embodiments, the vehicle may capture snapshots of the intersection 310 that do not include the stop sign 325. In some other embodiments, the vehicle may capture snapshots of the intersection 310 including only the back of the stop sign 325. In yet another embodiment, the vehicle may capture snapshots of intersections or other spaces including various different street signs, such as yield signs, pedestrian crossing signs, railroad crossing signs, speed limit signs, or the like. Further, non-signs, such as fire hydrants, mailboxes, etc., may also be captured in the snapshots. These objects in the images may then be detected and used to improve pose data of the snapshot as discussed herein.

In an example scenario, a vehicle equipped with one or more cameras completes the first image capture run 305 and the second image capture run 306. During these runs, the vehicle may capture images of the geographic areas visible from the corresponding locations. In FIG. 3B, the vehicle captures images of intersection 310. Specifically, the vehicle gathers snapshots of intersection 310 at the first snapshot location 330, the second snapshot location 335, the third snapshot location 340, and the fourth snapshot location 345. Snapshots may be captured during the first and/or second image capture runs (305, 306). In the displayed embodiment, all of the snapshots include stop sign 325.

The captured snapshots by the vehicle may then be uploaded to storage 125 (see FIG. 1) as street level image data. Additionally, the vehicle may be equipped with sensors to provide additional data associated with captured snap shots. For example, the vehicle may also upload pose data associated with each snapshot, in addition to the snapshots, to storage 125.

In the scenario of FIGS. 3A and 3B, the image capture runs 305 and 306 are nearly identical. However, in some embodiments, the image capture runs may be substantially different. Additionally, where needed, the initially estimated location data of the image capture runs may be improved with additional data and processing. This in turn may improve the determined pose data of snapshots taken during the vehicle trajectory runs.

While all four snapshots (330, 335, 240, and 345) may be captured during the first, second, or both image capture runs 305 and 306, the snapshots also may be captured during more than two vehicle trajectory runs. In other words, snapshots can be provided from different locations during the same image capture run, or from different image capture runs, or from a combination of both. For example, vehicle image capture run 305 may be responsible for snapshot 330, 335, and 340 while the second vehicle image capture run 306 provides snapshot 345. While the displayed embodiment shows two image capture runs, in other embodiments, the vehicle may complete more or less vehicle trajectory runs than those shown.

The captured, uploaded snapshots along with their associated, uploaded pose data may be used to populate a street level image data table 203 (see FIG. 2). The table 203 may be stored at server(s) 105 and/or storage 125 (see FIG. 1). The uploaded snapshots 330, 335, 340, and 345 may each be stored as a view code 206 within the street level image data table 203. In this case, the view codes 206 for snapshots 330, 335, 340, and 345 would be stored based on a POI type (table 203 column) and associated image identifier (table 203 row). Because all four snapshots include a stop sign 325 at intersection 310, the view codes 206 for the snapshots would be stored in the cell designated by the "stop signs" POI type column and the row dedicated to the image identifier for intersection 310 for table 203. In another embodiment, the snapshots may be stored in the cell designated by a POI type column for all street signs in general. Also, in one embodiment, the view codes 206 may also include the uploaded pose data associated with the snapshots for view codes 206.

Referring back to FIG. 2, rows in table 203 are specified by an image identifier. The image identifier may correspond to a panoramic view of a geographic area. For example, a panoramic view of intersection 310 may correspond to an image identifier row for the table 203. Accordingly, view codes 206 for the four snapshots may be recorded in the cell designated by the "stop signs" POI type column. In the illustrated scenario, intersection 310 has one stop sign 325. However, an intersection may have multiple stop signs. In this case, all snapshots of all stop signs at the intersection could be entered into the same cell designated by the image identifier row specifying that intersection and the POI type column specifying stop signs. In other words, a cell may include view codes of different stop signs located within the same geographic area.

The columns of table 203 are categorized by POI types, according to an implementation. In addition to stop signs, POI types may include other traffic signs, street numbers, business signs, fire hydrants, poles, a whole class of signs, and/or other identifiable objects of interest or class of objects to a map data user. Thus, a view code could be included in multiple cells if it contains multiple point of interest types. For example, if table 203 includes a first point of interest type column for stop signs and a second point of interest type column for traffic signs, then the view code 206 associated with snapshot 330 may be located in multiple cells of the table 203. This is because snapshot 330 has a stop sign 325 and a traffic sign 415. This view code would be located in cells designated by a point of interest type column for stop signs and a point of interest type column for traffic signs in the image identifier row for intersection 310. Consequently, view code 206 would be located in two different cells. In some embodiments, a view code may be located in even more cells.

The disclosed techniques use higher-confidence reference objects to improve pose data estimates. In some embodiments, the POI types specified by the columns of table 203 may also correspond to higher-confidence reference objects. For example, stop signs, traffic signs, street numbers, fire hydrants, poles, and/or business signs are all point of interest types that may be acceptable higher confidence reference objects.

As discussed earlier, some view codes 206 may be referenced in multiple cells of table 203 because view codes 206 may include multiple point of interest types (e.g. a stop sign and a traffic sign) or even a whole class of objects (e.g. all street signs). Thus, some snapshots may include multiple higher confidence reference objects. For example, FIG. 4A has a stop sign 325, a traffic sign 415 and a tree 420. In this example, the stop sign 325 and the traffic sign 415 would be acceptable higher confidence reference objects, whereas the tree 420 would not. All three objects are relatively large and fixed. Specifically, stop sign 325 and tree 420 are attached to the ground while traffic sign 415 is affixed to a pole attached to the ground. As a result, these three objects are fixed.

In this example, however, the tree 420 is not likely to be a valid higher confidence reference object because it is neither easily recognizable nor stationary. For example, when comparing snapshots captured at different times, the tree may not be in the same location in both snapshots. This is because the tree 420 and/or the leaves of the tree 420 may sway due to outside forces (wind). Consequently, it is unlikely that the tree 420 and/or points on the tree, such as leaves, would be in the same location in both snapshots. As a result, according to this embodiment, tree 420 is not selected as a stationary reference object.

Moreover, the tree 420 may not be easily recognizable. For example, there may be many other trees surrounding tree 420 that have a similar size, shape, color, and/or other characteristic. As a result, the tree 420 may be difficult to distinguish from other surrounding trees. The same would be true for points on the tree 420, such as the leaves. Because many of the leaves are a similar shape, color, and size, it may be difficult to ensure that a leaf identified in one snapshot taken at a first time is the same leaf that is identified in a second snapshot taken at a later time. Because the tree 420 and its points (e.g. leaves) are neither stationary nor easily recognizable, the tree 420 is not likely to be considered a higher confidence reference object.

Traffic sign 415, on the other hand, is likely to be considered a higher confidence reference object in this example because it is stationary and easily recognizable.

Specifically, the traffic sign 415 is attached to a pole that is attached to the ground. Furthermore, the traffic sign is rigid and does not articulate. As a result, is unlikely that the traffic sign, or any other points on the traffic sign, will move significantly between a first snapshot taken at a first time and a second snapshot taken at a later time. Moreover, traffic sign 415 is easily recognizable due to its size, shape (rectangle), color (green background and white text, a white border, and white bicycle symbol), text, symbols, and/or other characteristics. Because the traffic sign 415 is stationary and easily recognizable, in addition to being fixed and relatively large, the sign 415 is considered a higher confidence reference object in this example.

When view codes 206 corresponding to the uploaded snapshots are included in table 203, one or more bounding boxes (not displayed in the figures) may be defined in the corresponding uploaded snapshots. A bounding box is defined as the pixels surrounding the higher confidence reference objects. Because higher confidence reference objects may be the same as points of interest, a bounding box may be defined in a snapshot to surround a point of interest. The bounding box may be used by the pipeline 201 and system 202 (see FIG. 2) to help determine a location for the higher confidence reference object and/or the point of interest surrounded by the bounding box. Bounding box data, such as coordinates and/or other data relevant to the bounding box, may be used by the pipeline 201 and system 202 for further processing of the image data.

Next, the view codes 206 are filtered and organized 208 before being sent to geocoding engine 210. View codes 206 may be filtered to remove snapshots with poor quality (blurred images), incorrectly identified higher confidence reference objects, and/or inconsistent pose data. In the displayed embodiment, all four snapshots (330, 335, 340, and 345) are of a good quality and identify the same higher confidence reference object (stop sign 325) in the same geographic area (intersection 310) with consistent pose data. Thus, none of the view codes need to be removed. Once the view codes 206 are filtered, the view codes 206 may be clustered together to group only the view codes that include the same higher confidence reference object. In this case, all four snapshots are grouped together because they all include stop sign 325 at intersection 310. The clustered view codes 208 are then forwarded to engine 210.

Engine 210 relies on updated pose data 214, façade data 212, and the clustered view codes 208 to generate a geocode for a single view of the geographic area. The updated pose data 214 is received from the pose optimization system 202, which is described in further detail later. Façade data 212 may be stored at server(s) 105, storage 125, and/or at other storage devices. Engine 210 creates the geocode for intersection 310 by triangulating the received view codes 206 associated with the four snapshots (330, 335, 1040, and 345). Engine 210 also uses the façade data 212 to generate a geocode. The geocode is then used by engine 210 to send an approximate location 226 of the higher confidence reference object (stop sign 325) and/or the geographic area (intersection 310) to the pose optimization system 202.

The pose optimization system 202 may be located on server(s) 115. The system 202 may receive an output file 216 from server(s) 105. The file 216 may include view codes 206 associated with the four snapshots 330, 335, 340, and 345. Each view code 206 for each snapshot includes several parameters. These parameters include a view code identifier (view code ID), a trajectory run identifier (run_ID), a timestamp, a camera identifier (camera), and/or bounding box data (bounding box). For example, for the view code 206 associated with snapshot 330, the view code identifier may be 330, the trajectory run identifier may be 305, and the timestamp may indicate a time and/or date (e.g. 5:00 AM, 7/20/2013) at which the image was captured. Additionally, the parameter camera identifier may indicate the camera used (e.g. camera #1) while the bounding box data includes relevant bounding box data, such as coordinates. Although not displayed, the file 216 may also include the parameter cluster identifier ("cluster_id" or "geocode_id"). The cluster identifier parameter would indicate which cluster of view codes the view code in question may belong to. The remaining view codes 206 associated with the other snapshots would have their parameters populated in a similar fashion with data corresponding to each respective snapshot.

Although not displayed, in some embodiments, the system 202 receives an output file 216 via a geocode table from pipeline 201, as opposed to table 203 from pipeline 201. The geocode table is organized with rows specifying an object identifier, such as a higher confidence reference object. The geocode table may only have one column. Each cell contains a geocode output file for the object specified by that row. Each geocode output file contains the appropriate view codes 206 associated with the object specified for that row. In some embodiments, the geocode output file has the same parameters as the output file 216. The geocode output file may also include parameters for a position and a geocode of the object corresponding to that row.

The system 202 may also receive an approximate location 226 of the higher confidence reference object (stop sign) in the geographic area (intersection 310) in addition to the output file 216. While the system 202 uses location data 226 that is based on a geocode from engine 210, other data could be used to estimate the location data 226. This data includes geographic surveying data, GPS data, Wi-Fi hotspots, and/or other location data to estimate the geographic area (intersection 310) location and/or the higher confidence reference object (stop sign 325) location.

The object-in-image pose constraint conversion engine uses the output file 216 and location data 226 to generate an object-in-image pose constraint 220. The constraint 220 may represent the stop sign 325 and its location and orientation. This constraint 220 is then sent to pose optimizer 222 to generate updated pose data 224 associated with the received view codes 206 that correspond to snapshot 330, 335, 340, and 345. This updated pose data 224 is then sent to pipeline 201 as updated pose data 214 to be used by geocoding engine 210 to generate improved geocodes. The updated pose data 224 and 214 represents improved pose data estimates. This data may be used again to further improve the pose data estimates of the same, and/or different, street level image data.

In some embodiments, the components of pipeline 201 may be located on server(s) 105. Server(s) 105 may also perform some and/or all of the steps of pipeline 201. In some embodiments, the components of the pose optimization system may be located on server(s) 115. Server(s) 115 may also perform some and/or all of the steps performed by system 202. Also, the output file 216, in some embodiments, includes more, fewer, and/or different parameters than those described.

Figure 5:
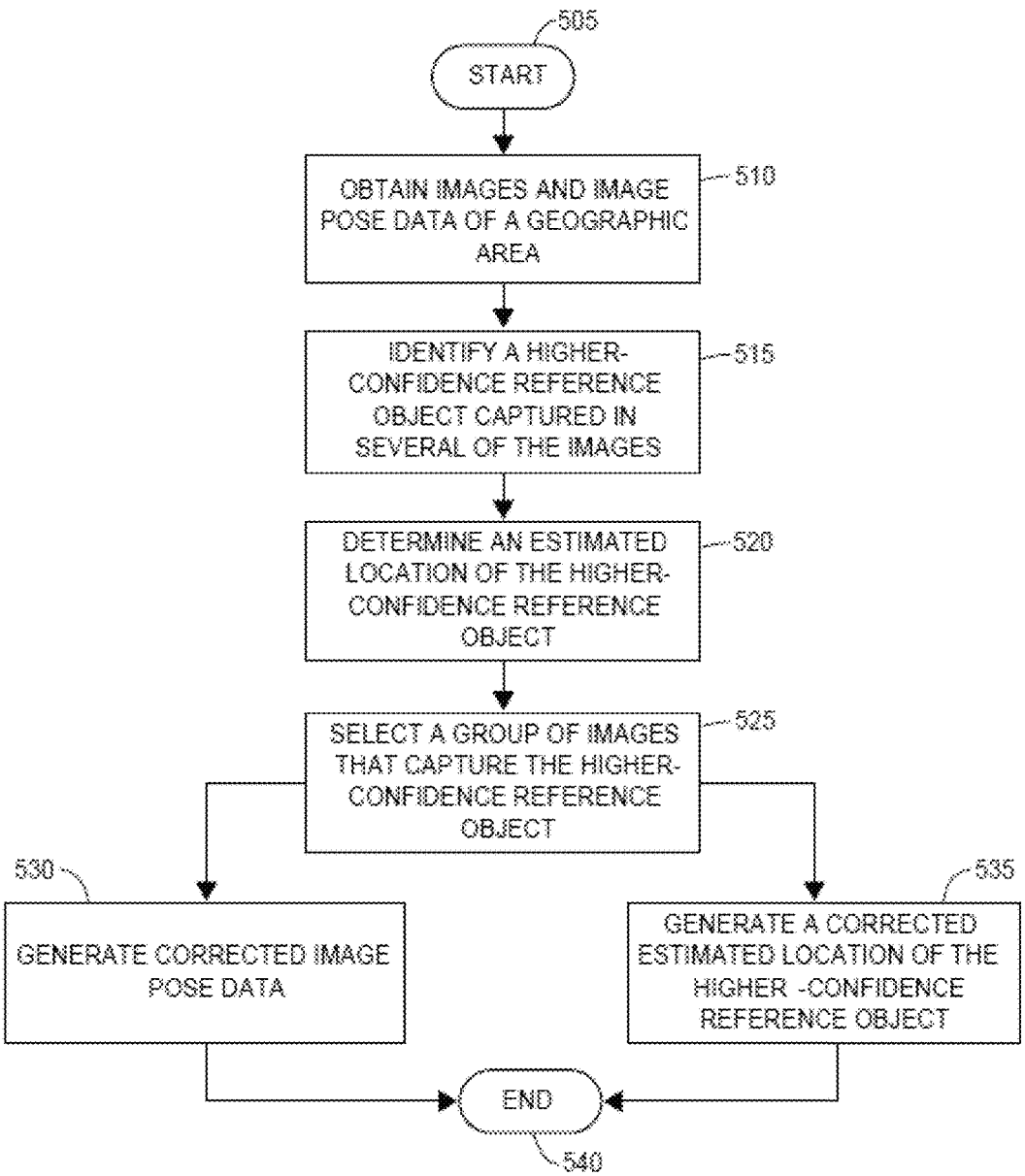
FIG. 5 is a flow diagram of an example method for improving image location and orientation based on detection of the higher confidence reference object, which can be implemented in the system of FIG. 1.

Example Method for Correcting Image Pose Data Using a Higher-Confidence Reference Object FIG. 5 displays one embodiment of a higher confidence reference object pose optimization method 500. The method begins (block 505) by obtaining images and image pose data geographic area (block 510). Next, the pose optimization system 202 identifies a higher confidence reference object that is captured in several of the images (block 515). After that, the system 202 determines an estimated location of the higher confidence reference object (block 520). Following this, the system 202 selects a group of images that capture the higher confidence reference object (block 525).

Once the group of images is selected (block 525), the system 202 may then generate corrected image pose data (block 530). Alternatively or simultaneously, after the group of images is selected (block 525), system 202 may then generate a corrected estimated location of the higher confidence reference object (block 535). The method finishes (block 540) after the corrected image pose data is generated (block 530) and/or the corrected location is generated (block 535). Method 500 may contain more, fewer, and/or different steps than those displayed in FIG. 5. Also, the steps shown in FIG. 5 may be executed in a different order than that shown.

The method 500 can be implemented in some or all of the modules illustrated in FIG. 2, for example. As a more specific example, block 515 can be implemented in the object-in-image pose constraint conversion engine 218 using the view codes 206 and the one or more view code output files 216, block 535 can be implemented in the pose optimizer 222, etc.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of various embodiments. This description should be read to include one or at least one and the singular also includes the plural unless it is obvious that it is meant otherwise.

Upon reading this disclosure, those of ordinary skill in the art will appreciate still additional alternative structural and functional designs for a system and a process for correcting pose image data through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The invention claimed is:

1. A method for automatically correcting camera pose data, the method comprising:
   obtaining, by one or more computing devices, a plurality of images of a geographic area and image pose data that indicates, for each of the plurality of images, respective approximate location and orientation of a camera used to generate the image;
   identifying, by the one or more computing devices, a reference object captured in at least one of the plurality of images by selecting the reference object based on (i) mobility or (ii) flexibility of the reference object;
   determining, by the one or more computing devices, an estimated location of the reference object;
   selecting, by the one or more computing devices, from the plurality of images, a plurality of groups of images in which the reference object is captured; and
   generating, by the one or more computing devices, corrected image pose data based at least in part on the plurality of groups of images and the estimated location of the reference object by aligning, by the one or more computing devices, one or more common points on a surface of the reference object within the plurality of groups of images in which the reference object is captured by aligning images from each of the plurality of groups captured from different positions from each other.

2. The method of claim 1, wherein:
obtaining the plurality of images comprises:
receiving, by the one or more computing devices, a first set of images collected along a first path, and
receiving, by the one or more computing devices, a second set of images collected along a second path; and
wherein selecting the plurality of groups of images comprises:
selecting images from each of the first set and the second set.

3. The method of claim 2, wherein the first path and the second path correspond to multiple passes past the reference object by a vehicle equipped with a camera.

4. The method of claim 2, wherein generating the corrected image pose data includes aligning, by the one or more computing devices, one or more common points on a surface of the reference object within the plurality of groups of images by aligning images from the first set and the second set captured from first and second positions, respectively.

5. The method of claim 1, further comprising:
generating, by the one or more computing devices, a corrected estimated location of the reference object based at least in part on the image pose data and the estimated location of the reference object.

6. The method of claim 5, wherein generating corrected image pose data and generating the corrected estimated location of the reference object occur simultaneously.

7. The method of claim 1, wherein the reference object is a street sign, and wherein selecting the plurality of groups of images comprises:
selecting a first one of the plurality of images that captured a front of the street sign, and
selecting a second one of the plurality of images that captured a back of the street sign.

8. The method of claim 1, wherein determining the estimated location of the reference object comprises receiving, by the one or more computing devices, survey data that specifies a location of the reference object, wherein the survey data was obtained through geographical surveying.

9. The method of claim 1, wherein determining the estimated location of the reference object includes applying, by the one or more computing devices, a structure-from-motion (SFM) technique to several of the plurality of images that capture the reference object.

10. The method of claim 1, wherein the reference object is further selected based on a type of object the reference object is.

11. A system for automatically correcting camera pose data, the system comprising:
one or more computing devices;
a non-transitory computer-readable medium storing thereon a plurality of instructions that, when executed by the one or more computing devices, cause the system to:
obtain a plurality of images of a geographic area and image pose data that indicates, for each of the plurality of images, respective approximate location and orientation of a camera used to generate the image,
obtain a reference object size threshold,
identify a reference object captured in at least several of the plurality of images by selecting the reference object based on (i) mobility or (ii) flexibility of the reference object,
determine an estimated location of the reference object,
select from the plurality of images, a plurality of groups of images in which the reference object is captured; and
generate corrected image pose data based at least in part on the estimated location of the reference object and those of the plurality of images that capture the reference object by aligning one or more common points on a surface of the reference object within the plurality of groups of images in which the reference object is captured by aligning images from each of the plurality of groups captured from different positions from each other.

12. The system of claim 11, wherein the plurality of images comprises:
a first set of images collected along a first path, and
a second set of images collected along a second path;
and wherein to generate the corrected image pose data, the instructions cause the system to:
select the plurality of groups of images that capture the reference object from each of the first set and the second set, and
generate the corrected image pose data based at least in part on the selected plurality of groups of images.

13. The system of claim 12, wherein the first path and the second path correspond to multiple passes past the reference object by a vehicle equipped with a camera.

14. The system of claim 12, wherein to generate the corrected image pose data, the instructions cause the system to align one or more common points on a surface of the reference object within the plurality of groups of images by aligning images from the first set and the second set captured from first and second positions, respectively.

15. The system of claim 11, wherein the image pose data describes an initial estimate of a path along which the plurality of images were collected, and wherein to generate corrected image pose data, the instructions cause the system to execute an optimization function that operates on a plurality of constraints, wherein the plurality of constraints includes (i) constraints that seek to preserve the initial estimate of the path, and (ii) constraints that seek to preserve the estimated location of the reference object.

16. The system of claim 11, wherein the instructions further cause the system to:
generate a corrected estimated location of the reference object based at least in part on the image pose data and the estimated location of the reference object.

17. The system of claim 16, wherein the instructions further cause the system to generate corrected pose data and generate the corrected estimated location of the reference object simultaneously.

18. A non-transitory computer-readable medium storing thereon instructions for automatically correcting camera pose data, wherein the instructions, when executed by one or more computing devices, cause the one or more computing devices to:
obtain a plurality of images of a geographic area and image pose data that indicates, for each of the plurality of images, respective approximate location and orientation of a camera used to generate the image by:
receiving a first set of images collected along a first path, and receiving a second set of images collected along a second path;

identify a reference object captured in at least several of the plurality of images by selecting the reference object based on (i) mobility or (ii) flexibility of the reference object;

determine an estimated location of the reference object;

select, from the plurality of images comprising the first and second sets of images, a group of images in which the reference object is captured;

generate corrected image pose data based at least in part on the group of images and the estimated location of the reference object by aligning one or more common points on a surface of the reference object within the group of images in which the reference object is captured and aligning images from the first set and the second set captured from first and second positions, respectively; and generate a corrected estimated location of the reference object based at least in part on the image pose data and the estimated location of the reference object.

19. The computer-readable medium of claim 18, wherein the first path and the second path correspond to multiple passes past the reference object by a vehicle equipped with a camera.

20. The computer-readable medium of claim 18, wherein the instructions further cause the one or more computing devices to generate corrected pose data and generate the corrected estimated location of the reference object simultaneously.

* * * * *